US006359913B1

(12) United States Patent
Lodenkamper

(10) Patent No.: US 6,359,913 B1
(45) Date of Patent: Mar. 19, 2002

(54) STABILIZATION OF INJECTION LOCKING OF CW LASERS

(75) Inventor: Robert W. Lodenkamper, Rancho Palos Verdes, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/374,319

(22) Filed: Aug. 13, 1999

(51) Int. Cl.$^7$ .................................................. H01S 3/098
(52) U.S. Cl. ............................ 372/18; 372/32; 372/26; 372/29
(58) Field of Search .............................. 372/18, 32, 29, 372/26

(56) References Cited

PUBLICATIONS

Ramos et al, Optical injection locking and phase–lock loop combined systems; Optics Letters,vol. 19,No. 1, Jan. 01, 1994.*
Man et al; Injection olocking 0f argon–ion lasers; Optics Letters,vol. 9 No. 8,8/84.*
Lesage et al; Servo–loop based on heterodyne interferometry for injection nlcking of cw NdYAG lasers; Optics Communications 115 (1995) pp. 291–296.*
"Servo–Loop Based on Heterodyne Interferometry for Injection Locking CW Nd: YAG Lasers", by Lesage, et al., *Optics Communications*, vol. 115, pp. 291–296, Mar. 15, 1995.
"Optical Injection Locking and Phase Lock Loop Combined Systems", by Ramos, et al., *Optics Letters*, vol. 19, No. 1, pp. 4–6, Jan. 1, 1994.
"High–Performance Homodyne Optical Injection Phase–Lock Loop Using Wide–Linewidth Semiconductor Lasers", by Bordinalli, et al., *IEEE Photonics Technology*, vol. 8, No. 9, pp. 1217–1219, Sep. 1996.
"Injection Locking of Argon–Ion Lasers", by Man, et al., *Optics Letters*, vol. 9, No. 8, Aug. 1984, pp. 333–334, Aug. 1994.
"Laser Phase and Frequency Stabilization Using an Optical Resonator", by Drever, et al., *Applied Physics*, vol. 31, pp. 97–105, Feb. 10, 1983.

* cited by examiner

*Primary Examiner*—Leon Scott, Jr.
(74) *Attorney, Agent, or Firm*—Katten Munchin Zavis

(57) ABSTRACT

An injection locking system for lasers. In particular, a signal from a master laser is phase modulated and injected into a slave laser. The phase difference φ is maintained at zero by way of a phase locked loop. By maintaining the phase difference φ at zero, the frequency drift is compensated by maintaining the frequency within a predetermined locking range.

17 Claims, 1 Drawing Sheet

STABILIZATION OF INJECTION LOCKING OF CW LASERS

This invention was made with Government support under F30602-96-C-0273 awarded by the US Air Force Research Laboratory. The Government has certain rights in this invention.

BACKGROUND OF THE INVENTION

1. Field of the Invention

The present invention relates to a stabilized injection locking system for lasers in which the light from a master laser is phase modulated before it is injected into a slave laser.

2. Description of the Prior Art

Injection locking of two continuous wave (CW) lasers is known in the art. Examples of such systems are disclosed in "Servo-Loop Based on Heterodyne Interferometry for Injection Locking of CW Nd: YAG Lasers", by Lesage, et al., *Optics Communications*, Vol. 115, pages 291–296, Mar. 15, 1995; "Optical Injection Locking and Phase Lock Loop Combined Systems", by Ramos, et al., *Optics Letters*, Vol. 19, No. 1, Jan. 1, 1994, pages 4–6; "High-Performance Homodyne Optical Injection Phase-Lock Loop Using Wide-Linewidth Semiconductor Lasers", by Bordonalli, et al., *IEEE Photonics Technology*, Vol. 8, No. 9, pages 1217–1219, September 1996; and "Injection Locking of Argon-Ion Lasers", by Man, et al., *Optics Letters*, Vol. 9, No. 8, August 1984, pages 333–334, hereby incorporated by reference. In general, injection locking of CW lasers is a process in which a fraction of the output of one of the CW lasers (i.e. a master laser) is injected into a second CW laser (i.e. slave laser) such that the injected signal drives the slave laser's lasing mode. In most cases, the spectrum of the slave laser output will contain two terms: a strong term near the free-running slave laser frequency and a weak term at the frequency of the injected signal. If the frequency of the injected signal is close enough to that of the free running slave laser, the weak input captures the slave laser output. The slave laser output spectrum becomes monochromatic at the injected frequency, and the two lasers are injection locked. The range of frequency differences over which this process occurs is called the locking range.

Unfortunately, the locking range is relatively small compared to typical laser frequency drift rates. As such, two injection locked lasers without frequency compensation will typically lose lock due to frequency drift in a relatively short period of time. As such, such lasers are known to be provided with some form of frequency drift control in order to provide long term stability of the injection locking. In such systems, as the frequency difference between the master laser and the free-running slave laser varies within the locking range, the relative phase between the two optical signals varies. As such, the frequency drift control schemes must measure the phase difference either directly or indirectly since there is no way to measure the frequency difference directly if the lasers are locked. An example of a scheme which uses a direct approach is disclosed in "HIGH PERFORMANCE HOMODYNE OPTICAL INJECTION PHASE LOCK LOOP USING WIDE-LINE WIDTH SEMICONDUCTOR LASERS" supra. In the direct approach, an optical homodyne detector is used to measure the phase difference between the two laser signals. Unfortunately, there are two disadvantages with such direct approach schemes. These disadvantages relate to the complexity and the required stability of the homodyne optics and the requirement that the phase shift $\phi=0$ within the cavity be enforced based on a measurement of the relative optical phase outside the cavity.

In order to avoid these disadvantages, indirect phase measurement methods have been developed. One of the more common indirect phase measurement injection locking schemes is disclosed in "LASER PHASE AND FREQUENCY STABILIZATION USING AN OPTICAL RESONATOR", by Drever, et al. *Applied Physics* Vol. 31, pages 97–105, hereby incorporated by reference. In this approach, a laser is stabilized by applying a phase dither to the output of the laser, coupling the phase modulated light into a passive optical resonator (the reference cavity) and measuring the amplitude dither at the modulation frequency in the light reflected from the reference cavity. This amplitude dither is used as a control signal since it is bipolar and is zero when the laser frequency is exactly resonant with the reference cavity. The frequency of the phase dither is chosen to be large enough such that the phase modulation (PM) sidebands are far enough away from the optical carrier that they are reflected by the cavity instead of being transmitted. When this locking technique is used to stabilize injection locking, the slave laser acts as a reference cavity and the basic stabilization mechanism is unchanged because the PM sidebands do not couple into the slave cavity and do not affect the injection locking.

SUMMARY OF THE INVENTION

Briefly, the present invention relates to an injection locking system for lasers. In particular, a signal from a master laser is phase modulated and injected into a slave laser. The optical phase difference $\phi$ between the master and slave lasers is maintained at zero by way of a phase locked loop. By maintaining the phase difference $\phi$ at zero, the frequency drift is compensated by maintaining the frequency difference at a fixed point within the locking range.

DESCRIPTION OF THE DRAWINGS

These and other objects of the present invention will be readily understood with reference to the following specification and attached drawing wherein:

The drawing is a block diagram of an injection locking system in accordance with the present invention.

DETAILED DESCRIPTION

Figure 1:
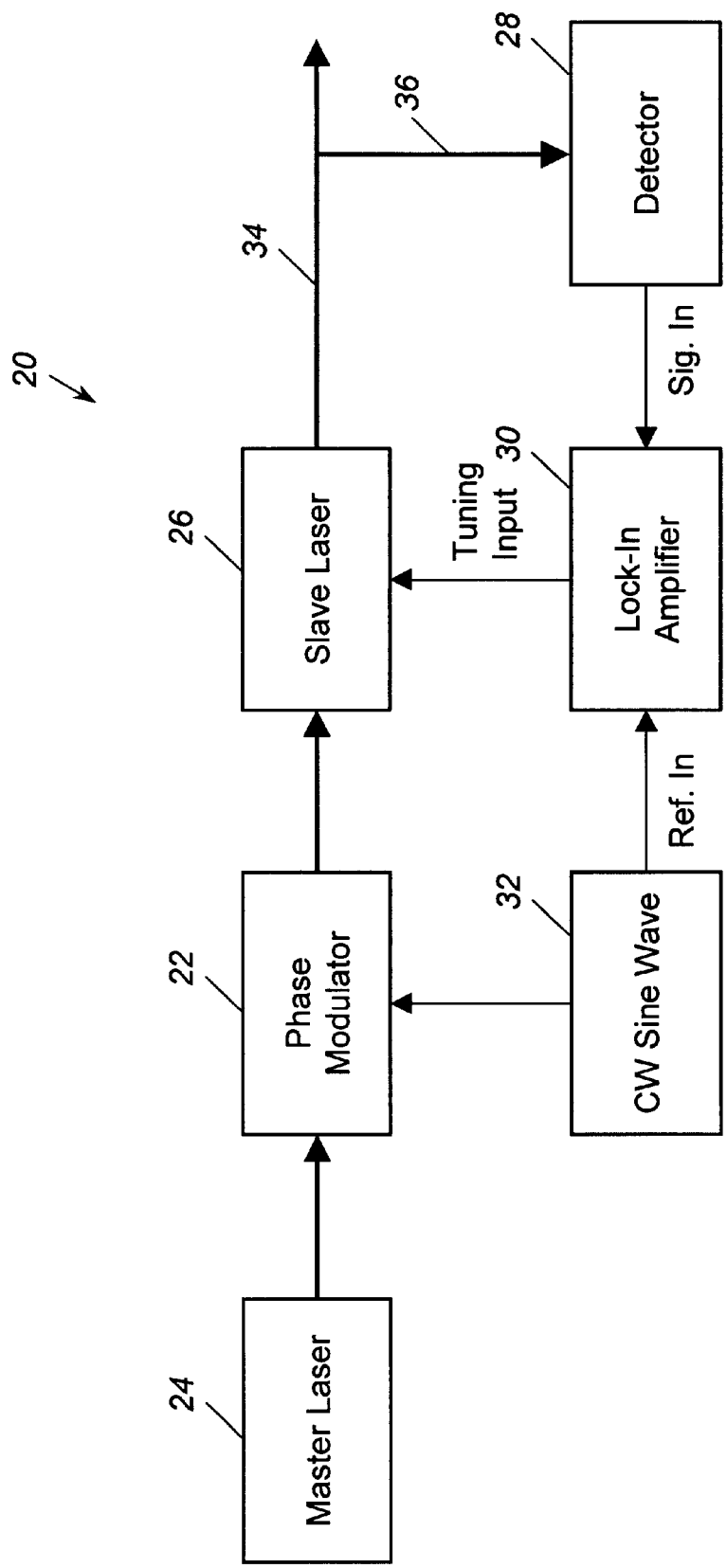

The present invention relates to a stabilized injection locking system for continuous wave (CW) lasers. When light is injected from one laser (the master) into another laser (the slave), a physical process known as injection locking will occur if the frequency difference between master and free-running slave is within the locking range. When the master and slave are injection locked, their respective outputs are at exactly the same frequency. Therefore, as used here, frequency difference means the frequency difference between the master and the free-running slave (i.e. the frequency the slave would emit if the light from the master laser were completely blocked). Since the locking range is always a very small fraction of an optical frequency, the laser frequency drift will typically lead to loss of injection locking as the frequency difference drifts out of the locking range. Therefore, it is necessary to compensate for laser frequency drift in order to maintain injection locking for long periods of time. The present invention is a method for performing this drift compensation function that is especially appropriate for semiconductor lasers.

The fundamental difference between the present invention and stabilization methods disclosed in the prior art, such as in "Laser Phase and Frequency Stabilization Using An Optical Resonator", supra, is that they lock to different operating points. The method in accordance with the present invention locks to an operating point where the master and slave lasers are in phase, while the known stabilization system as discussed above locks to the operating point of zero frequency difference between injected master frequency and free-running slave laser frequency. Although for many lasers, these two operating points are identical, they are not the same for semiconductor lasers, which are a very attractive class of lasers for applications. In fact, in a semiconductor laser, it is possible for the operating point in the known system to lie outside the stable injection locking range, and it is impossible to stabilize injection locking of such lasers with the known system method. The disclosed method does not suffer from this disadvantage, since the operating point of zero phase difference between the two lasers is always at or near the center of a stable locking range, even for a semiconductor laser.

In the present invention, the light from the master oscillator is phase modulated before it is injected into the slave laser. The effect of this input phase modulation (PM) is to produce an amplitude modulation (AM) of the slave laser output. Injection locking can only occur if the difference of the optical frequencies of the two lasers is within a small "locking range" and the amount of output AM is a function of this frequency difference. There is always a point at or near the center of the locking range where the output AM is zero, so a control loop that enforces a condition of zero output AM in the presence of input PM acts to stabilize the injection locking. This is required in practical applications, since the injection locking range is typically much smaller than the frequency drift for lasers.

The injection locked slave laser can be regarded as a nonlinear system with two inputs, the amplitude and phase of the injected optical signal, and two outputs, the amplitude and phase of the slave optical emission. Since the locking range is defined as the range of frequency differences between master and slave in which the slave laser stably locks to the master, it is appropriate to linearize the slave system about its steady state operating point for injection locking analysis. The operating point may be fully described by three parameters, the injected amplitude $A_i$, the slave amplitude $A_0$, and the relative phase $\phi$ between master and slave. As the frequency difference between the master and the slave varies within the locking range, there is a corresponding variation of the relative phase $\phi$.

Therefore, the "locking range" can be regarded as either a range of frequency differences, or the corresponding range of relative phases $\phi$. The present invention is based on measurement and control of the phase difference to enforce operation at, for example, the $\phi=0$ operating point.

In semiconductor lasers, a physical effect called phase-amplitude coupling occurs, where changing an optical amplitude causes a corresponding change in an optical phase and/or frequency. This effect causes semiconductor lasers to have significantly different injection locking properties than lasers which do not experience phase-amplitude coupling. In particular, for a laser without phase-amplitude coupling, the locking range is centered about the point of zero frequency difference and this point is also the point at which the relative phase $\phi=0$. On the other hand, for a semiconductor laser, the locking range is not centered about the point of zero frequency difference. In fact, it is possible for the point of zero frequency difference to lie outside the locking range altogether. In such a case, it is clear that a stabilization method that enforced the condition of zero frequency would not be effective. However, the $100=0$ operating point lies at or near the center of the locking range, no matter how strong or weak the phase-amplitude coupling effect is. Therefore, the $\phi=0$ operating point is in general a stable operating point for injection locking, and it is particularly appropriate for semiconductor lasers due to their strong phase-amplitude coupling.

The measurement of $\phi$ is nontrivial, since it is generally difficult to measure relative phases at optical frequencies. In addition, $\phi$ is the phase difference at the slave laser itself, and a direct measurement of the relative phase of master and slave would necessarily have to be performed at some distance away from the lasers. It would then be extremely difficult to characterize and control the propagation phase shifts between the lasers and measurement system so well that the relative phase at the slave could be determined. For these reasons, this invention incorporates an indirect measurement technique for the relative phase $\phi$. One of the results of the linearized injection locking analysis is a set of transfer function relating input amplitude and phase fluctuations, $\delta A_i$ and $\delta\phi_i$ respectively, to the resulting slave amplitude and phase fluctuations, $\delta A_0$ and $\delta\phi_0$ respectively. These fluctuations are all assumed to be small. The transfer function H relating input phase fluctuations to output amplitude fluctuations is given by Equation (1) below:

$$H \equiv \frac{\delta A_0}{\delta \phi_i} = \frac{A_i \gamma_e s (A_0 s + 2 A_0 \Gamma_r - A_i \gamma_e)}{(A_0 s + A_i \gamma_e)(s^2 + 2\Gamma_r s + \Gamma_r^2 + \Omega_r^2)} \phi \quad \phi \ll 1 \quad (1)$$

where $\Omega_r$ and $\Gamma_r$ are the frequency and damping respectively of the slave laser relaxation resonance, s is the complex frequency, $\gamma_e$ is the external coupling rate of the slave laser cavity, and all other quantities have been defined above. In order to simplify Equation (1), it is assumed that $\phi \ll 1$ as indicated. The essential feature of Eq. 1 is that H is proportional to $\phi$. Therefore, to enforce operation at the desired $\phi=0$ operating point, it suffices to enforce operation at a point where $\delta A_0$ is zero in the presence of a small input phase dither $\delta\phi_i$. This concept is the basic idea of the present invention, and we proceed to discuss the specific embodiment shown in FIG. 1.

Referring to the drawing, a system in accordance with the present invention is generally identified with the reference numeral 20. Heavy lines in the drawing indicate optical signals, and light lines indicate electrical signals. The optical configuration is simply a chain starting at the master laser 24 proceeding through a phase modulator 22, for example, a model UTP phase modulator as provided by Uniphase Corporation and then into the slave laser 26. The phase modulator 22 provides the phase dither $\delta\phi_i$, at a frequency determined by the CW sine wave generator 32. The frequency at which the dither is applied is chosen to optimize the performance of the system. Due to the input phase dither, the slave laser optical output, on optical path 34, generally has an amplitude dither $\delta\phi_0$ given by Eq. 1, so a portion of the slave laser output is split off, such as by a beam splitter, along a branch optical path 36 coupled as an input to a detector 28, for example, a low noise photoreceiver available from New Focus Corporation. The electrical output from the detector 28 contains a signal at the dither frequency with amplitude proportional to $\delta A_0$, in addition to a DC signal and noise. To obtain a proper control signal from the detector output, it is necessary to recover the sign of the dither $\delta A_0$ which cannot be done from the detector 28 output alone. However, lock-in detection provided by the lock-in amplifier 30 with inputs from the CW sine wave generator 32 (the lock-in reference) and the detector 28 (the lock-in signal) gives a signed output from the lock-in amplifier which is proportional to $\delta A_0$. In addition, lock-in detection provides high noise rejection which is likely to be necessary in practice. The lock-in output is then applied to a frequency tuning input of the slave laser 26 in a negative feedback configuration that acts to enforce a condition of $\delta A_0=0$. This can be regarded as a phase locked loop configuration. From our earlier considerations, we see that this system enforces the desired $\phi=0$ operating point, which ensures stable injection locking.

Obviously, many modifications and variations of the present invention are possible in light of the above teachings. Thus, it is to be understood that, within the scope of the appended claims, the invention may be practiced otherwise than as specifically described above.

I claim:

1. An injection locking system for controlling the frequency between an injected signal from a master laser and a slave laser, the system comprising:

a master laser having a first optical output signal which forms an injected signal;

a phase modulator for phase modulating said first optical output signal and generating a modulated signal;

a slave laser coupled to said phase modulator for receiving said modulated signal and generating a second optical output signal;

means for splitting off a portion of the second optical output signal;

a detector for detecting the portion of the second optical output signal obtained from said means for splitting off, and generating therefrom a signal representative of the phase difference between said injected signal and said second optical output signal; and a control circuit for maintaining said phase difference at a predetermined value.

2. The injection locking system as recited in claim 1, where said predetermined value is selected such that frequency difference between said master laser and said slave laser is within the locking range therebetween.

3. The injection locking system as recited in claim 2, wherein said predetermined value is $\phi=0$.

4. The injection locking system as recited in claim 1, wherein said control circuit includes said detector and forms a phase locked loop.

5. The injection locking system as recited in claim 4, wherein said slave laser is a laser whose frequency is a function of a tuning signal applied thereto.

6. The injection locking system as recited in claim 5, wherein said phase locked loop also includes a carrier signal circuit for generating an electrical carrier signal input to the phase modulator.

7. The injection locking system as recited in claim 6, wherein said carrier signal circuit includes a continuous wave (CW) sine wave generator.

8. The injection locking system as recited in claim 6, further including a circuit for comparing said carrier signal with said detector signal and forming an error signal.

9. The injection locking system as recited in claim 8, wherein said error signal is provided as a tuning input to said slave laser.

10. The injection locking systems as recited in claim 1, wherein said detector is part of a measuring means, for measuring the phase difference between said injected signal and said second optical output signal, and wherein said detector generates a detector output signal.

11. The injection locking systems as recited in claim 10, wherein said measuring means further includes means for generating an electrical carrier signal.

12. The injection locking system as recited in claim 11 wherein said measuring means further includes means for comparing said electrical carrier signal with said detector output signal.

13. A method for controlling the relative frequency drift of an injection locked master and slave lasers, the method comprising the steps of:

(a) providing a master laser defining a first optical output signal;

(b) modulating said first optical output signal defining a modulated signal;

(c) injecting said modulated signal into said slave laser;

(d) generating in the slave laser a second optical output signal;

(e) splitting off a portion of the second optical output signal to a detector;

(f) generating in the detector a signal proportional to a phase difference between said first and second optical output signals; and (g) maintaining the phase difference between said first and second optical output signals at a predetermined value.

14. The method as recited in claim 13, wherein said step (g) maintains said phase difference at a predetermined value of $\phi=0$.

15. The method as recited in claim 13, wherein said step (f) includes:

detecting the second optical output signal and generating an electrical signal therefrom; and comparing said electrical signal with a reference signal.

16. The method as recited in claim 5, further comprising generating said reference signal as an electrical sine wave signal.

17. The method as recited in claim 13, further comprising utilizing said slave laser as a laser whose frequency is a function of an applied tuning input signal.

* * * * *